(12) United States Patent
Kupratis et al.

(10) Patent No.: US 12,466,548 B2
(45) Date of Patent: Nov. 11, 2025

(54) AIRCRAFT VERTICAL STABILIZER WITH AIR SYSTEM

(71) Applicant: RTX Corporation, Farmington, CT (US)

(72) Inventors: Daniel B. Kupratis, Wallingford, CT (US); Paul R. Hanrahan, Sedona, AZ (US); Benjamin T. Mylrea, Jupiter, FL (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/512,719

(22) Filed: Nov. 17, 2023

(65) Prior Publication Data

US 2025/0162709 A1    May 22, 2025

(51) Int. Cl.
| | |
|---|---|
| *B64C 21/06* | (2023.01) |
| *B64C 5/06* | (2006.01) |
| *B64C 39/00* | (2023.01) |
| *B64D 27/02* | (2006.01) |
| *B64C 39/10* | (2006.01) |

(52) U.S. Cl.
CPC ............... *B64C 21/06* (2013.01); *B64C 5/06* (2013.01); *B64C 39/00* (2013.01); *B64D 27/02* (2013.01); *B64C 39/10* (2013.01)

(58) Field of Classification Search
CPC .......... B64C 21/06; B64C 5/06; B64C 39/00; B64C 39/10; B64D 27/02
See application file for complete search history.

(56) References Cited

U.S. PATENT DOCUMENTS

| | | | | |
|---|---|---|---|---|
| 2,428,585 A | * | 10/1947 | Rogers ................. | F16L 37/008 244/129.1 |
| 3,576,300 A | * | 4/1971 | Palfreyman ........... | B64D 27/20 244/1 N |
| 4,477,040 A | * | 10/1984 | Karanik ................ | B64D 33/00 415/908 |
| 5,263,667 A | * | 11/1993 | Horstman ............. | B64C 21/06 244/209 |
| 5,366,177 A | * | 11/1994 | DeCoux ................ | B64C 21/06 244/209 |
| 5,899,416 A | * | 5/1999 | Meister ................. | B64C 21/06 244/87 |
| 6,622,973 B2 | * | 9/2003 | Al-Garni .............. | F03D 1/06 244/206 |

(Continued)

OTHER PUBLICATIONS

EP Search Report for EP Patent Application No. 24213292.6 dated Mar. 11, 2025.

*Primary Examiner* — Medhat Badawi
(74) *Attorney, Agent, or Firm* — Getz Balich LLC

(57) ABSTRACT

A system is provided for an aircraft. This aircraft system includes an aircraft and an air system. The airframe includes a body and a vane connected to the body. The vane projects spanwise away from the body to a vane tip. The vane extends longitudinally between a leading edge and a trailing edge. The vane extends laterally between a first vane side and a second vane side. The air system includes a circuit inlet, a circuit outlet and an air circuit. The circuit inlet is arranged with the body and laterally offset from the vane. The circuit outlet is arranged with the vane. The air circuit extends within the airframe from the circuit inlet to the circuit outlet.

21 Claims, 10 Drawing Sheets

(56) References Cited

U.S. PATENT DOCUMENTS

| | | | | |
|---|---|---|---|---|
| 6,752,358 | B1* | 6/2004 | Williams | F15D 1/12 244/208 |
| 6,923,403 | B1* | 8/2005 | Dizdarevic | B64C 1/0009 244/36 |
| 7,200,999 | B2* | 4/2007 | Bagnall | B64D 33/02 60/785 |
| 7,793,884 | B2* | 9/2010 | Dizdarevic | B64C 39/12 244/36 |
| 7,866,609 | B2* | 1/2011 | Parikh | B64C 21/06 244/209 |
| 8,128,037 | B2* | 3/2012 | Powell | B64C 21/025 244/130 |
| 8,282,037 | B2* | 10/2012 | Jain | B64D 33/02 244/53 B |
| 8,322,655 | B1* | 12/2012 | Kismarton | B64C 5/02 244/119 |
| 8,336,804 | B2* | 12/2012 | Hoetzeldt | B32B 5/024 244/1 N |
| 8,398,022 | B2* | 3/2013 | Cazals | B64D 27/20 244/119 |
| 8,484,894 | B2* | 7/2013 | Sakurai | B64C 21/02 49/73.1 |
| 8,496,203 | B2* | 7/2013 | Schwarze | B64C 9/16 244/215 |
| 8,596,584 | B2* | 12/2013 | Knacke | B64C 21/02 244/209 |
| 8,695,915 | B1* | 4/2014 | Jones | B64C 1/40 244/1 N |
| 9,132,909 | B1* | 9/2015 | Khorrami | B64C 21/10 |
| 9,193,443 | B2* | 11/2015 | Voege | B64C 3/00 |
| 9,272,772 | B2* | 3/2016 | Reckzeh | B64C 21/04 |
| 9,278,753 | B2* | 3/2016 | Reckzeh | B64C 23/069 |
| 9,623,959 | B2* | 4/2017 | Schrauf | B64C 21/06 |
| 9,701,399 | B1* | 7/2017 | Booher, Sr. | B64C 21/06 |
| 10,005,545 | B2* | 6/2018 | Alderman | B64C 3/187 |
| 10,183,740 | B2* | 1/2019 | Gerber | B64C 5/06 |
| 10,384,796 | B2* | 8/2019 | Alexander | B64C 30/00 |
| 10,472,052 | B2* | 11/2019 | Heller | B64C 5/02 |
| 10,532,805 | B2* | 1/2020 | Gallman | B64C 21/025 |
| 10,556,670 | B2* | 2/2020 | Koppelman | B64C 21/06 |
| 10,899,451 | B2* | 1/2021 | Saint-Marc | B64D 11/003 |
| 10,967,955 | B2* | 4/2021 | Heuer | B64C 21/025 |
| 10,974,817 | B2* | 4/2021 | Heuer | B64C 5/02 |
| 11,040,769 | B2* | 6/2021 | Schrauf | F15D 1/12 |
| 11,208,202 | B2* | 12/2021 | Kreuzer | B64C 21/06 |
| 11,247,776 | B2* | 2/2022 | Princen | B64D 27/14 |
| 11,286,041 | B2* | 3/2022 | Hui | B64C 3/48 |
| 11,433,990 | B2* | 9/2022 | Sanz Martinez | F02C 7/045 |
| 11,584,514 | B2* | 2/2023 | Heuer | B64C 21/02 |
| 11,845,538 | B2* | 12/2023 | Herrles | B64C 21/025 |
| 2003/0132351 | A1* | 7/2003 | Billman | F42B 10/38 244/199.1 |
| 2005/0151023 | A1* | 7/2005 | Ribbe | A63H 27/02 244/190 |
| 2006/0284022 | A1* | 12/2006 | Harrigan | B64C 13/16 244/203 |
| 2007/0023571 | A1* | 2/2007 | Kawai | B64D 27/16 244/119 |
| 2007/0029450 | A1* | 2/2007 | Kloker | B64C 21/06 244/209 |
| 2007/0084297 | A1* | 4/2007 | Powell | B64C 21/025 73/861 |
| 2007/0221788 | A1* | 9/2007 | Meister | B64C 21/08 244/208 |
| 2007/0264152 | A1* | 11/2007 | Zhao | B22F 3/1134 419/2 |
| 2008/0296439 | A1* | 12/2008 | Cloft | B64D 33/02 244/208 |
| 2009/0020653 | A1* | 1/2009 | Schrauf | B64C 21/025 244/209 |
| 2009/0212165 | A1* | 8/2009 | Parikh | B64C 21/06 244/209 |
| 2009/0250293 | A1* | 10/2009 | Gleine | B32B 5/024 181/290 |
| 2009/0261204 | A1* | 10/2009 | Pitt | B64C 21/08 244/201 |
| 2009/0266937 | A1* | 10/2009 | Frankenberger | B64C 21/06 244/209 |
| 2010/0181434 | A1* | 7/2010 | Powell | B64C 21/08 244/209 |
| 2010/0181435 | A1* | 7/2010 | Sakurai | B64C 21/08 244/209 |
| 2010/0294892 | A1* | 11/2010 | Syassen | B64C 21/06 244/209 |
| 2011/0095128 | A1* | 4/2011 | Schwarze | B64C 5/06 244/87 |
| 2011/0095136 | A1* | 4/2011 | Schwarze | B64C 9/16 244/215 |
| 2011/0306285 | A1* | 12/2011 | Heuer | B64D 13/02 454/76 |
| 2012/0037760 | A1* | 2/2012 | Koppelman | B64C 21/06 244/209 |
| 2012/0187252 | A1* | 7/2012 | Gerber | B64C 5/06 244/209 |
| 2013/0001356 | A1* | 1/2013 | Llamas Sand_ín et al. | B64C 5/06 244/54 |
| 2013/0025727 | A1* | 1/2013 | Gerber | B64C 21/06 244/209 |
| 2013/0175402 | A1* | 7/2013 | Voege | B64C 21/06 244/209 |
| 2013/0270390 | A1* | 10/2013 | Schrauf | B64C 5/06 244/119 |
| 2014/0021304 | A1* | 1/2014 | Gerber | B64C 3/26 244/35 R |
| 2014/0224435 | A1* | 8/2014 | Stawski | E06B 3/486 160/192 |
| 2014/0295747 | A1* | 10/2014 | Schmid | B64D 13/00 454/76 |
| 2015/0008684 | A1* | 1/2015 | Ching | E05D 11/00 292/288 |
| 2015/0259060 | A1* | 9/2015 | Khorrami | B64C 9/18 244/1 N |
| 2016/0009402 | A1* | 1/2016 | Hunter | B64C 39/02 244/53 R |
| 2016/0159465 | A1* | 6/2016 | Koppelman | B64C 3/26 244/209 |
| 2017/0197701 | A1* | 7/2017 | Gielda | B64D 37/34 |
| 2017/0197706 | A1* | 7/2017 | García Nieto | B64C 3/182 |
| 2018/0134373 | A1* | 5/2018 | Reckzeh | F15D 1/008 |
| 2018/0265208 | A1* | 9/2018 | Yousef | B64C 21/01 |
| 2019/0106201 | A1* | 4/2019 | Heuer | B64C 3/26 |
| 2019/0106202 | A1* | 4/2019 | Heuer | B64C 5/02 |
| 2021/0221494 | A1* | 7/2021 | Ahn | G05D 1/0816 |
| 2023/0138513 | A1* | 5/2023 | Ribeiro | B64D 27/357 244/53 R |
| 2023/0166832 | A1* | 6/2023 | Sato | B64D 27/32 244/204.1 |
| 2023/0264801 | A1* | 8/2023 | Lazzara | B64C 39/10 244/130 |
| 2024/0043144 | A1* | 2/2024 | Maldonado | B60F 5/02 |
| 2024/0253763 | A1* | 8/2024 | Vassberg | B64C 1/16 |

\* cited by examiner

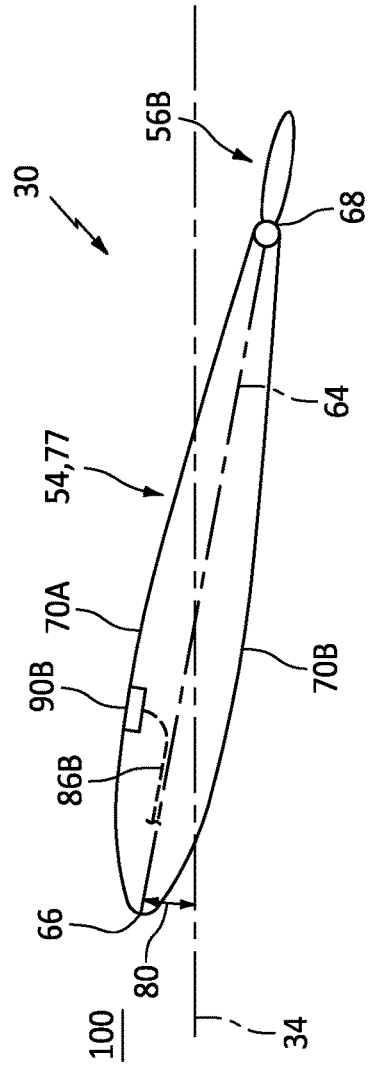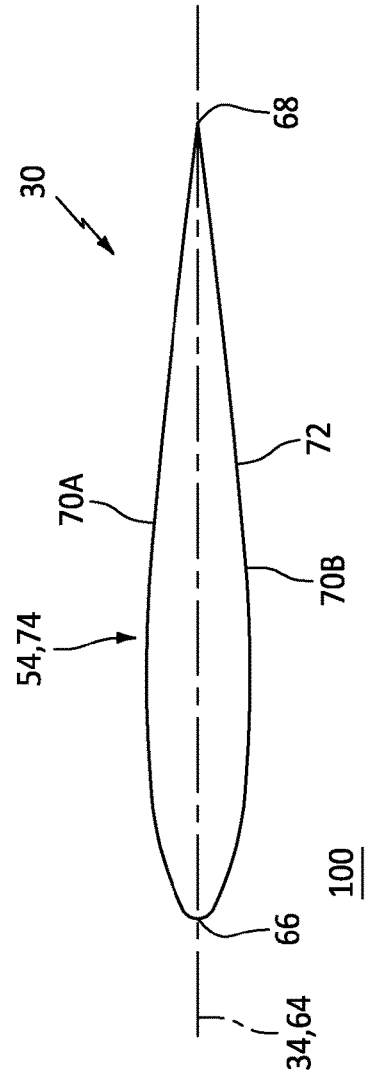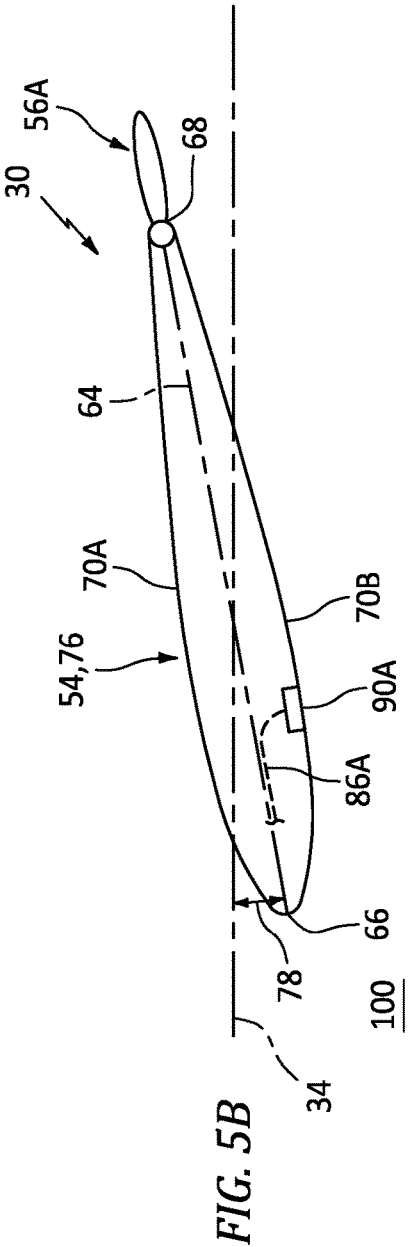

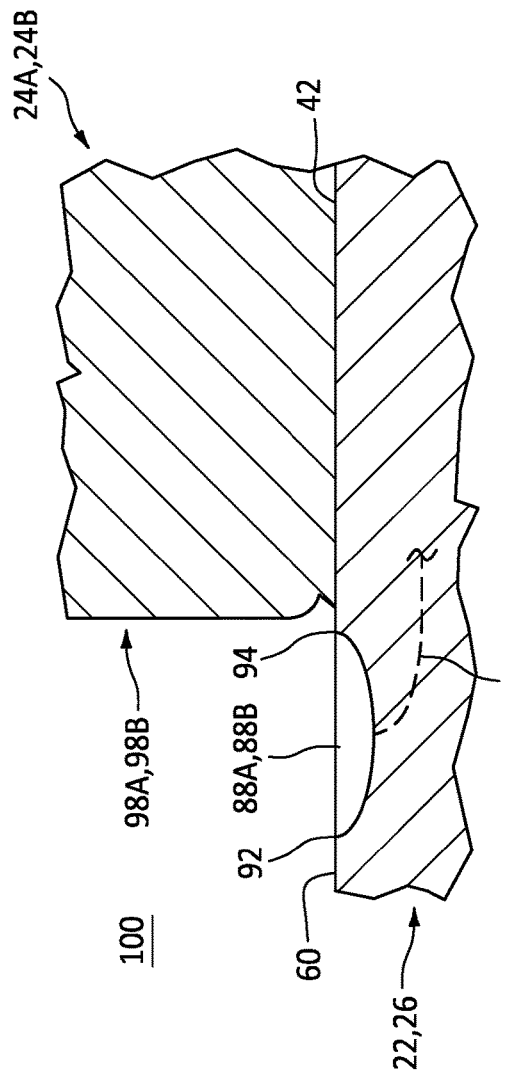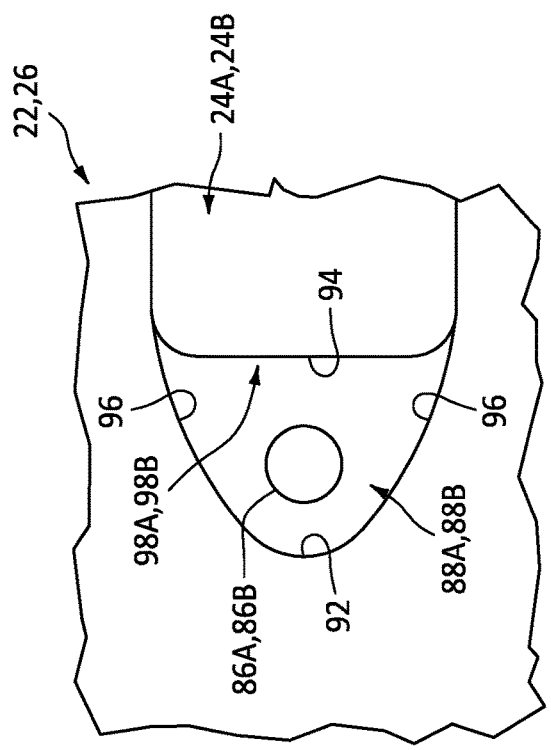

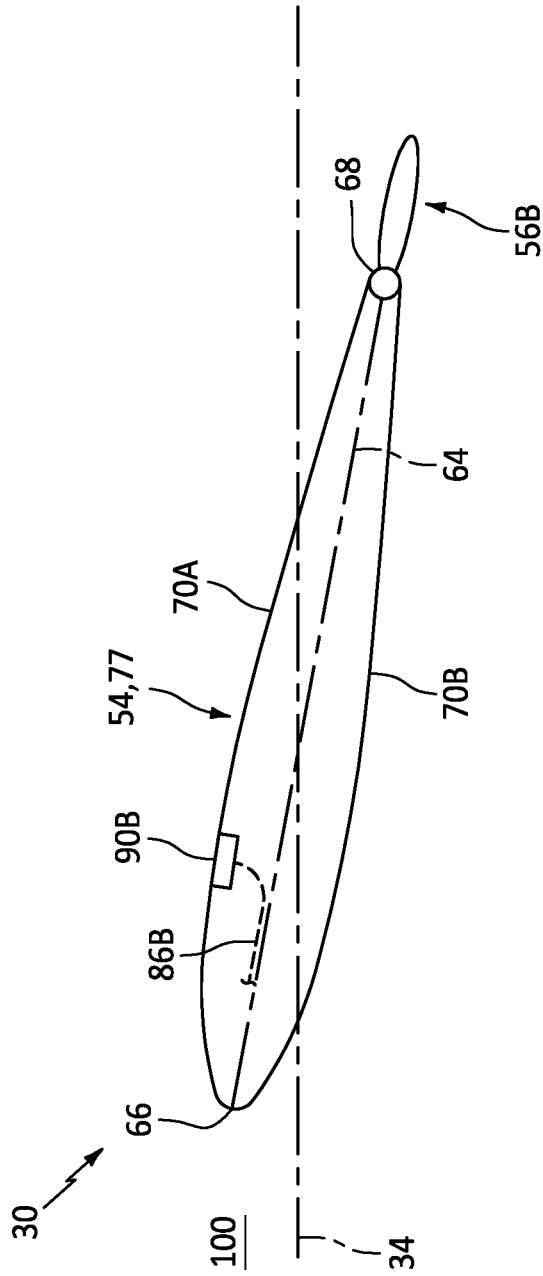
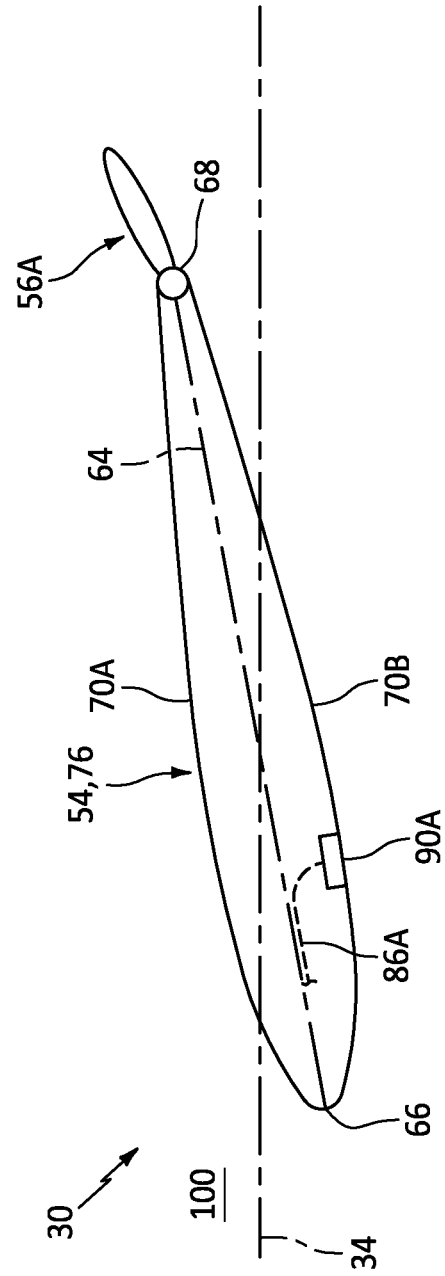

AIRCRAFT VERTICAL STABILIZER WITH AIR SYSTEM

BACKGROUND OF THE DISCLOSURE

1. Technical Field

This disclosure relates generally to an aircraft and, more particularly, to an vertical stabilizer for the aircraft.

2. Background Information

An aircraft may include a vertical stabilizer at an aft, downstream end of the aircraft. Various types and configurations of aircraft and vertical stabilizers are known in the art. While these known aircraft and vertical stabilizers have various benefits, there is still room in the art for improvement.

SUMMARY OF THE DISCLOSURE

According to an aspect of the present disclosure, a system is provided for an aircraft. This aircraft system includes an aircraft and an air system. The airframe includes a body and a vane connected to the body. The vane projects spanwise away from the body to a vane tip. The vane extends longitudinally between a leading edge and a trailing edge. The vane extends laterally between a first vane side and a second vane side. The air system includes a circuit inlet, a circuit outlet and an air circuit. The circuit inlet is arranged with the body and laterally offset from the vane. The circuit outlet is arranged with the vane. The air circuit extends within the airframe from the circuit inlet to the circuit outlet.

According to another aspect of the present disclosure, another system is provided for an aircraft. This aircraft system includes a vertical stabilizer and an air system. The vertical stabilizer is configured as or otherwise includes a vane. The vane projects spanwise out to a vane tip. The vane extends longitudinally between a leading edge and a trailing edge. The vane extends laterally between a first vane side and a second vane side. The air system includes a first air circuit and a second air circuit. The first air circuit extends from a first circuit inlet to a first circuit outlet. The first circuit inlet is located remote from the vane. The first circuit outlet is arranged along the second vane side. The second air circuit extends from a second circuit inlet to a second circuit outlet. The second circuit inlet is located remote from the vane. The second circuit outlet is arranged along the first vane side.

According to still another aspect of the present disclosure, another system is provided for an aircraft. This aircraft system includes an airframe body, a vane, a first rudder and a second rudder. The airframe body has a centerline. The vane is connected to the aircraft body. The vane projects spanwise out to a vane tip. The vane extends longitudinally between a leading edge and a trailing edge. The vane extends laterally between a first vane side and a second vane side. A first portion of the vane has a first mean line extending from the leading edge to the trailing edge. The first mean line is angularly offset from the centerline by a first stagger angle. A second portion of the vane has a second mean line extending from the leading edge to the trailing edge. The second mean line is angularly offset from the centerline by a second stagger angle opposite the first stagger angle. The first rudder is attached to the vane and spanwise overlaps the first portion of the vane. The second rudder is attached to the vane and spanwise overlaps the second portion of the vane.

The system may also include an air system including a first air circuit and a second air circuit. The first air circuit may extend from a first circuit inlet to a first circuit outlet. The first circuit inlet may be disposed along the airframe body remote from the vane. The first circuit outlet may be arranged along the first portion of the vane at the second vane side. The second air circuit may extend from a second circuit inlet to a second circuit outlet. The second circuit inlet may be disposed along the airframe body remote from the vane. The second circuit outlet may be arranged along the second portion of the vane at the first vane side.

The first circuit inlet may be disposed to and laterally spaced from the vane first side. The second circuit inlet may be disposed to and laterally spaced from the vane second side.

The second air circuit may be fluidly decoupled from the first air circuit.

The vertical stabilizer may also include a first rudder and a second rudder. The first rudder may be located at the trailing edge and spanwise overlap the first circuit outlet. The second rudder may be located at the trailing edge and spanwise overlap the second circuit outlet.

The system may also include a first propulsion system and a second propulsion system. The first propulsion system may include a first airflow inlet. The first circuit inlet may be laterally aligned with and upstream of the first airflow inlet. The second propulsion system may include a second airflow inlet. The second circuit inlet may be laterally aligned with and upstream of the second airflow inlet.

The vane may be located laterally between and longitudinally overlap the first propulsion system and the second propulsion system.

A first portion of the vane may have a first mean line extending from the leading edge to the trailing edge. The first circuit outlet may be arranged along the first portion of the vane. A second portion of the vane may have a second mean line extending from the leading edge to the trailing edge. The second circuit outlet may be arranged along the second portion of the vane. The first mean line may be angularly offset from the second mean line.

The airframe may also include a vertical stabilizer located at an aft end of the body. The vertical stabilizer may include the vane.

The system may also include a powerplant including a powerplant inlet. The powerplant may be disposed to the first vane side and connected to the body. The circuit inlet may be disposed upstream of and laterally overlapping the powerplant inlet.

The powerplant may be configured as a propulsion system for the aircraft.

The system may also include a second powerplant disposed to the second vane side and connected to the body.

The second powerplant may include a second powerplant inlet. The air system may also include a second circuit inlet disposed upstream of and laterally overlapping the second powerplant inlet.

The vane may project spanwise out from an exterior surface of the body to the vane tip. The circuit inlet may include a recess projecting into the body from the exterior surface of the body.

The circuit outlet may be disposed along the vane second side.

The circuit inlet may be disposed to the vane first side.

At least a first portion of the vane may be angularly offset from a centerline of the airframe by a first portion stagger angle such that the vane second side along the first portion of the vane forms a suction side of the first portion of the vane. The circuit outlet may be disposed along the suction side of the first portion of the vane.

A second portion of the vane may be angularly offset from the centerline of the airframe by a second portion stagger angle such that the vane first side along the second portion of the vane forms a suction side of the second portion of the vane. The air system may also include a second circuit outlet disposed along the suction side of the second portion of the vane.

The system may also include a first rudder and a second rudder. The first rudder may be arranged along the first portion of the vane at the trailing edge. The second rudder may be arranged along the second portion of the vane at the trailing edge. The first rudder may be configured to move independent of the second rudder.

The first portion of the vane may be located spanwise between the body and the second portion of the vane.

The circuit inlet may be a first circuit inlet. The circuit outlet may be a first circuit outlet. The air circuit may be a first air circuit. The air system may also include a second circuit inlet, a second circuit outlet and a second air circuit extending within the airframe from the second circuit inlet to the second circuit outlet. The vane may be a first vane. The airframe may also include a second vane connected to the body. The second vane may project spanwise away from the body to a vane tip of the second vane. The second vane may extend longitudinally between a leading edge of the second vane and a trailing edge of the second vane. The second vane may extend laterally between a first vane side of the second vane and a second vane side of the second vane. The second vane side of the second vane may laterally face the first vane side of the first vane. The second circuit inlet may be arranged with the body and may be laterally offset from the second vane. The second circuit outlet may be arranged with the second vane.

The first circuit outlet may be arranged along the second vane side of the first vane. The second circuit outlet may be arranged along the first vane side of the second vane.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIGS. 5A-C are partial schematic sectional illustrations of the vertical stabilizer at various span locations.
FIG. 6 is a partial sectional illustration of a portion of the aircraft at an interface between an air circuit and a propulsion system.
FIG. 7 is a plan view illustration of a portion of the aircraft at the interface between the air circuit and the propulsion system.
FIGS. 8A and 8B are partial schematic sectional illustrations of the vertical stabilizer at various span locations during a first aircraft maneuver.

DETAILED DESCRIPTION

Figure 1:
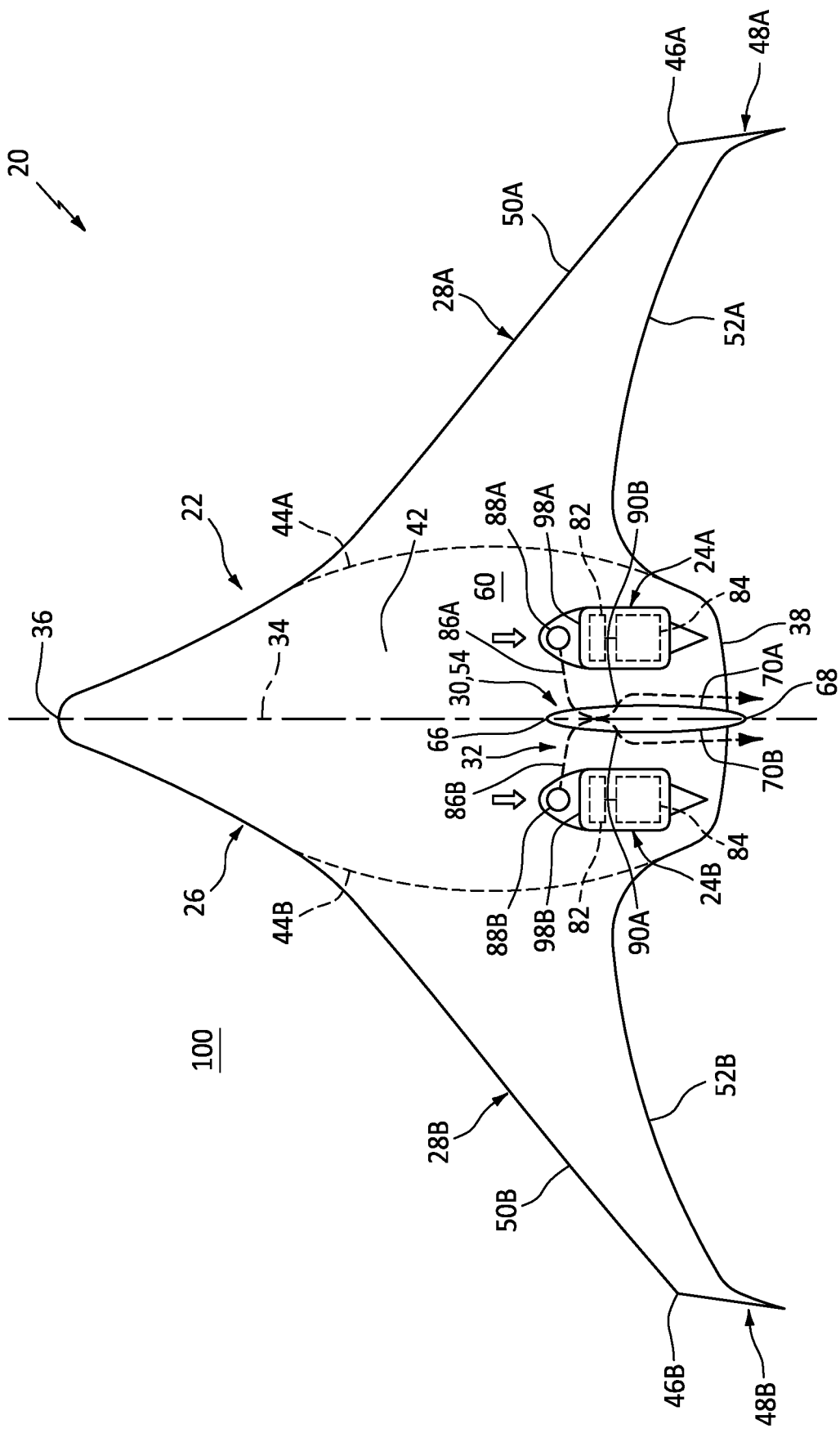
FIG. 1 is a plan view illustration of an aircraft.

FIG. 1 illustrates a blended wing body (BWB) aircraft 20. This aircraft 20 includes an airframe 22 and one or more propulsion systems 24A and 24B (generally referred to as "24"). The aircraft airframe 22 includes a body 26 (e.g., a fuselage), one or more wings 28A and 28B (generally referred to as "28") and a vertical stabilizer 30. The aircraft 20 also includes an air system 32 for the vertical stabilizer 30.

Figure 2:
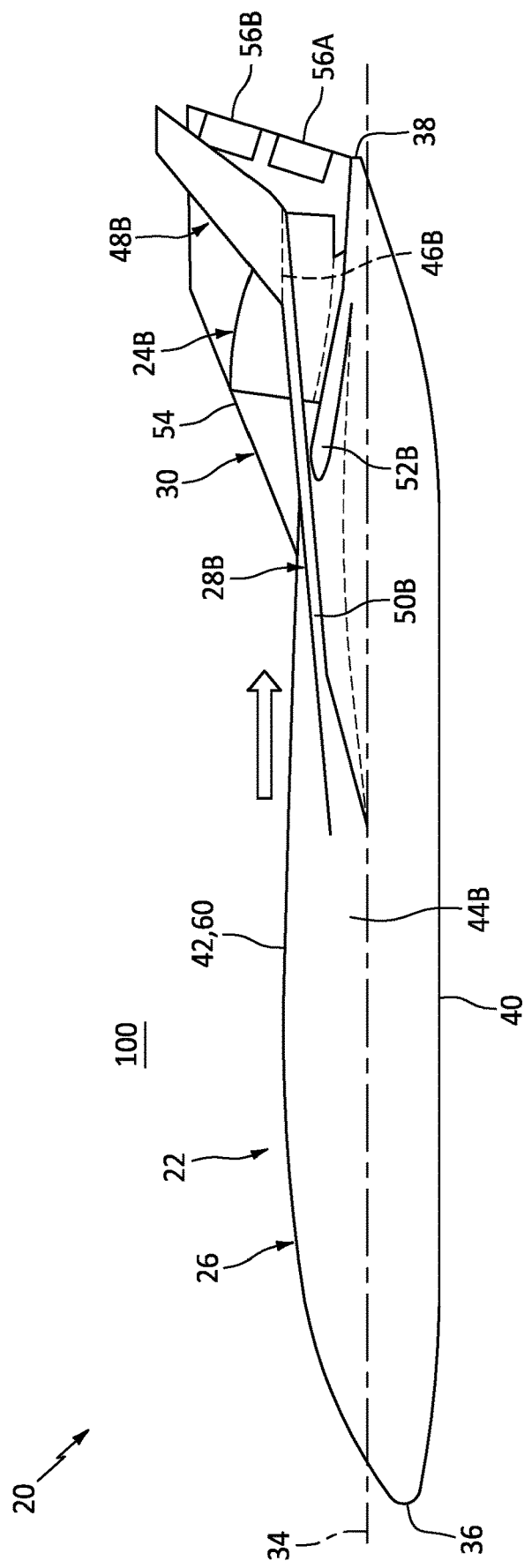
FIG. 2 is a side view illustration of the aircraft.
Figure 3:
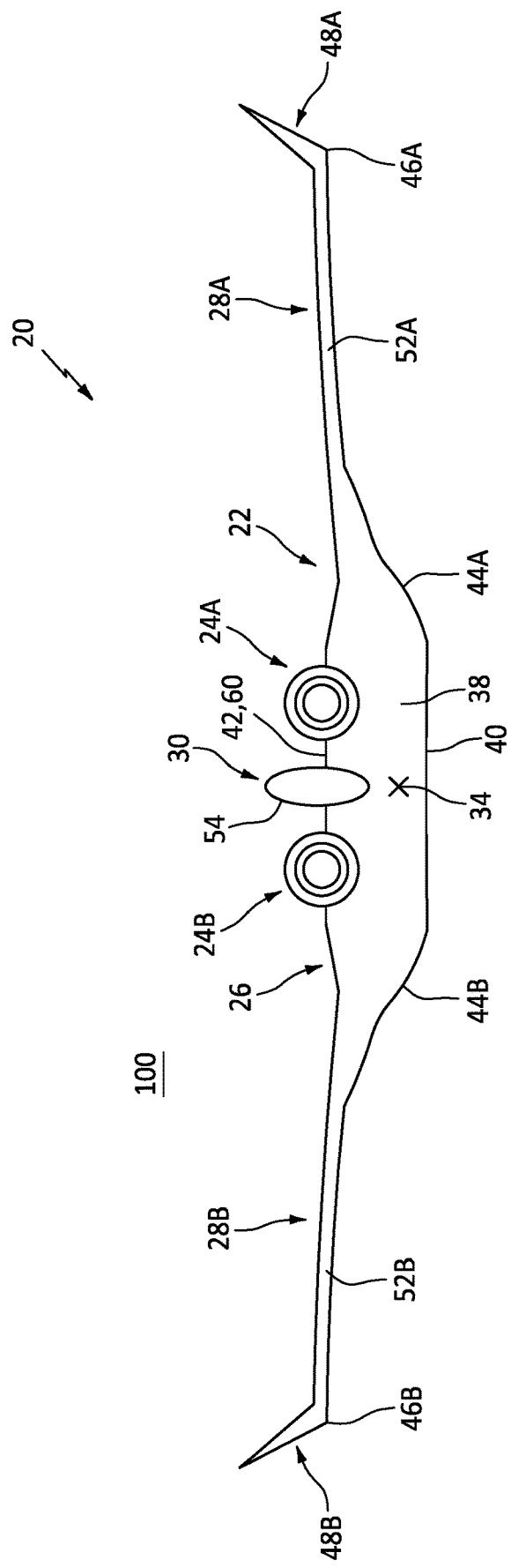
FIG. 3 is an end view illustration of the aircraft.

The aircraft body 26 extends longitudinally along a centerline 34 between and to a forward, upstream end 36 of the aircraft body 26 and an aft, downstream end 38 of the aircraft body 26. This centerline 34 may be a centerline axis of the aircraft 20, the aircraft airframe 22 and/or the aircraft body 26. Referring to FIG. 2, the centerline 34 may be substantially (e.g., within +/−five degrees) or completely parallel with a horizon line when the aircraft 20 is flying in level flight. The aircraft body 26 extends vertically between and to opposing vertical bottom and top sides 40 and 42 of the aircraft body 26. The body bottom side 40 is vertically below the body top side 42 with respect to a gravitational direction when the aircraft 20 is flying in level flight. Referring to FIGS. 1 and 3, the aircraft body 26 extends laterally between and to opposing lateral sides 44A and 44B (generally referred to as "44") of the aircraft body 26.

The aircraft wings 28 of FIGS. 1 and 3 are arranged to the opposing lateral sides 44 of the aircraft body 26. Each of the aircraft wings 28 is connected to (e.g., fixed to) the aircraft body 26. Each of the aircraft wings 28A, 28B projects spanwise along a span line of the respective aircraft wing 28A, 28B out from the aircraft body 26, at the respective body lateral side 44A, 44B, to a distal tip 46A, 46B of the respective aircraft wing 28. At the wing tip 46A, 46B, the respective aircraft wing 28 may (or may not) be configured with a winglet 48A, 48B. Each of the aircraft wings 28 of FIG. 1 extends longitudinally along a mean line of the respective aircraft wing 28 from a leading edge 50A, 50B (generally referred to as "50") of the respective aircraft wing 28 to a trailing edge 52A, 52B (generally referred to as "52") of the respective aircraft wing 28. The wing leading edge 50 of FIG. 1, at a base of the respective aircraft wing 28, is longitudinally spaced aft, downstream from the body forward end 36. The wing trailing edge 52 of FIG. 1, at the wing base, is longitudinally spaced forward, upstream from the body aft end 38. The present disclosure, however, is not limited to such an exemplary aircraft wing arrangement.

Figure 4A:
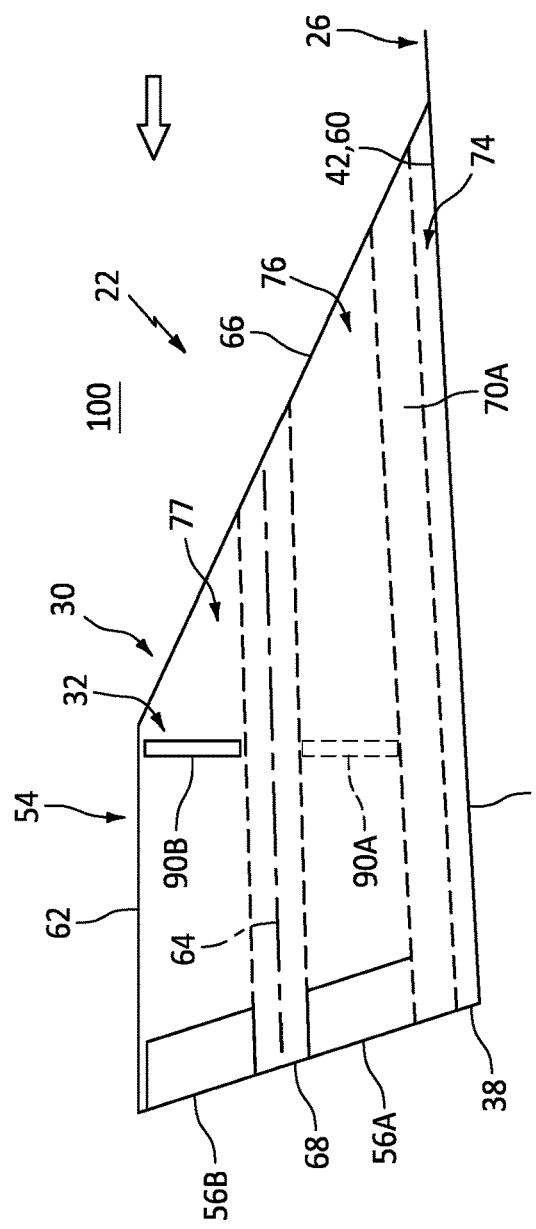
FIG. 4A is a partial side view illustration of a section of the aircraft along a first side of a vertical stabilizer.
Figure 4B:
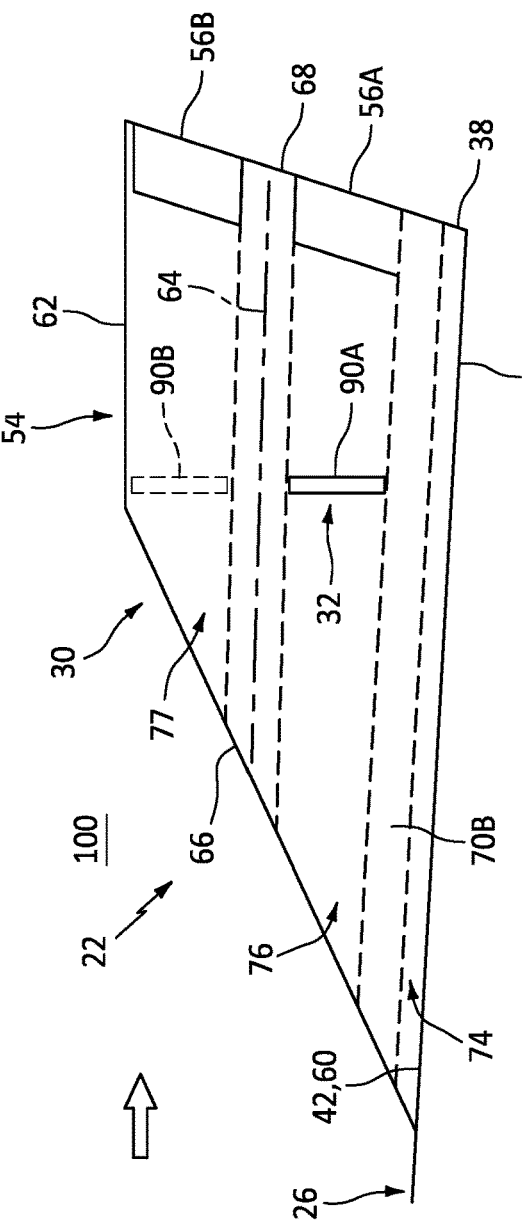
FIG. 4B is a partial side view illustration of a section of the aircraft along a second side of the vertical stabilizer.

The vertical stabilizer 30 of FIGS. 1 and 3 is disposed along the body top side 42. This vertical stabilizer 30 is arranged laterally between the aircraft propulsion systems 24 longitudinally at (e.g., on, adjacent or proximate) the body aft end 38. Referring to FIGS. 4A and 4B, the vertical stabilizer 30 includes a vane 54 (e.g., a stationary surface) and one or more rudders 56A and 56B (generally referred to as "56") (e.g., movable control surfaces).

The vane 54 is connected to (e.g., fixed to) the aircraft body 26 at the body top side 42. This vane 54 projects spanwise along a span line of the vane 54 (e.g., vertically) away from the aircraft body 26 and its body top side 42.

More particularly, the vane 54 of FIGS. 4A and 4B projects spanwise out from an exterior surface 60 (e.g., an outermost aero surface) of the aircraft body 26 at the body top side 42 to a distal tip 62 of the vane 54. The vane 54 extends longitudinally along a mean line 64 (e.g., a chord line where the vane 54 is symmetrical, a camber line where the vane 54 is cambered) of the vane 54 from a leading edge 66 of the vane 54 to a trailing edge 68 of the vane 54. Referring to FIGS. 5A-C, the vane 54 extends laterally (e.g., perpendicular to the mean line 64) between and to opposing lateral sides 70A and 70B (generally referred to as "70") of the vane 54. These vane lateral sides 70 extend longitudinally along the mean line 64 between and meet at the vane leading edge 66 and the vane trailing edge 68. Referring to FIGS. 4A and 4B, each of the vane elements 66, 68, 70A and 70B extends spanwise from a base 72 of the vane 54 at the body top side 42 to the vane tip 62.

FIG. 5A illustrates a base portion 74 of the vane 54. Referring to FIGS. 4A and 4B, this base portion 74 may form a (e.g., complete) spanwise extending section of the vane 54 spanwise adjacent the aircraft body 26. At one or more locations spanwise along the base portion 74 (e.g., at the vane base 72), referring to FIG. 5A, the vane mean line 64 of the base portion 74 may be arranged parallel with the centerline 34. The vane mean line 64 may also be laterally aligned with the centerline 34.

FIG. 5B illustrates an inner portion 76 of the vane 54. Referring to FIGS. 4A and 4B, this inner portion 76 may form a (e.g., complete) spanwise extending section of the vane spanwise between the base portion 74 and an outer portion 77 of the vane 54. At one or more locations spanwise along the inner portion 76 (e.g., at a spanwise midpoint of the inner portion 76), referring to FIG. 5B, the vane mean line 64 of the inner portion 76 may be angularly offset from the vane mean line 64 of the base portion 74 (see FIG. 5A) and/or the centerline 34. The vane mean line 64 of the inner portion 76 of FIG. 5B, for example, is angularly offset from the vane mean line 64 of the base portion 74 (see FIG. 5A) and/or the centerline 34 by an inner portion stagger angle 78. This inner portion stagger angle 78 may be a non-zero acute angle greater equal to or less than twenty degrees (20°); e.g., between one-half of a degrees (0.5°) and five degrees (5°) between five degrees (5°) and ten degrees (10°) or between ten degrees (10°) and twenty degrees (20°). However, in other embodiments, the inner portion stagger angle 78 may be greater than twenty degrees (20°).

At the vane trailing edge 68, the vane mean line 64 of the inner portion 76 may be laterally spaced from the vane mean line 64 of the base portion 74 (see FIG. 5A) and/or the centerline 34 in a first lateral direction. In addition or alternatively, at the vane leading edge 66, the vane mean line 64 of the inner portion 76 may be laterally spaced from the vane mean line 64 of the base portion 74 (see FIG. 5A) and/or the centerline 34 in a second lateral direction. With this staggered arrangement, the vane first side 70A along the inner portion 76 may form a pressure side of the inner portion 76, and the vane second side 70B along the inner portion 76 may form a suction side of the inner portion 76.

FIG. 5C illustrates the outer portion 77 of the vane 54. Referring to FIGS. 4A and 4B, this outer portion 77 may form a (e.g., complete) spanwise extending section of the vane 54 spanwise adjacent or near the vane tip 62. At one or more locations spanwise along the outer portion 77 (e.g., at or near the vane tip 62), referring to FIG. 5C, the vane mean line 64 of the outer portion 77 may be angularly offset from the vane mean line 64 of the base portion 74 (see FIG. 5A) and/or the centerline 34. The vane mean line 64 of the outer portion 77 of FIG. 5C, for example, is angularly offset from the vane mean line 64 of the base portion 74 (see FIG. 5A) and/or the centerline 34 by an outer portion stagger angle 80. This outer portion stagger angle 80 may be a non-zero acute angle greater equal to or less than twenty degrees (20°); e.g., between one-half of a degrees (0.5°) and five degrees (5°), between five degrees (5°) and ten degrees (10°), or between ten degrees (10°) and twenty degrees (20°). However, in other embodiments, the inner portion stagger angle 78 may be greater than twenty degrees (20°). The outer portion stagger angle 80 may be equal in magnitude to the inner portion stagger angle 78, but opposite in direction to the inner portion stagger angle 78.

At the vane trailing edge 68, the vane mean line 64 of the outer portion 77 may be laterally spaced from the vane mean line 64 of the base portion 74 (see FIG. 5A) and/or the centerline 34 in the second lateral direction. In addition or alternatively, at the vane leading edge 66, the vane mean line 64 of the outer portion 77 may be laterally spaced from the vane mean line 64 of the base portion 74 (see FIG. 5A) and/or the centerline 34 in the first lateral direction. With this staggered arrangement, the vane first side 70A along the outer portion 77 may form a suction side of the outer portion 77, and the vane second side 70B along the outer portion 77 may form a pressure side of the outer portion 77.

Referring to FIGS. 4A, 4B and 5B, the inner rudder 56A is movably attached to the vane 54 at the vane trailing edge 68. The inner rudder 56A, for example, may be pivotally attached to the inner portion 76 of the vane 54. Referring to FIGS. 4A and 4B, the inner rudder 56A may be partially or completely spanwise aligned with the inner portion 76 of the vane 54. The inner rudder 56A of FIGS. 4A and 4B, for example, extends spanwise along and overlaps the inner portion 76 of the vane 54 at the vane trailing edge 68.

Referring to FIGS. 4A, 4B and 5C, the outer rudder 56B is movably attached to the vane 54 at the vane trailing edge 68. The outer rudder 56B, for example, may be pivotally attached to the outer portion 77 of the vane 54. Referring to FIGS. 4A and 4B, the outer rudder 56B may be partially or completely spanwise aligned with the outer portion 77 of the vane 54. The outer rudder 56B of FIGS. 4A and 4B, for example, extends spanwise along and overlaps the outer portion 77 of the vane 54 at the vane trailing edge 68.

Referring to FIG. 1, each of the aircraft propulsion systems 24 is connected to (e.g., fixed to) the aircraft body 26 at the body top side 42 and the body aft end 38. These aircraft propulsion systems 24 are arranged to the opposing lateral sides 70 of the vertical stabilizer 30 and its vane 54. The first propulsion system 24A of FIG. 1, for example, is spaced laterally from the vane 54 and its vane base 72 (see FIGS. 4A and 4B) at the vane first side 70A by a lateral first distance. The second propulsion system 24B of FIG. 1 is spaced laterally from the vane 54 and its vane base 72 (see FIGS. 4A and 4B) at the vane second side 70B by a lateral second distance, which may be equal to the first distance. The vane 54 may thereby be arranged laterally midway between the first propulsion system 24A and the second propulsion system 24B. The vane 54 of FIG. 1 may also longitudinally overlap a portion or an entirety of each aircraft propulsion system 24 along the centerline 34. The vane 54 thereby provides a divider (e.g., a structural barrier and/or a flow separator) laterally between the first propulsion system 24A and the second propulsion system 24B. This divider may reduce effects of crosswinds on the aircraft propulsion systems 24 and/or may prevent other disruptions associated with the aircraft propulsion systems 24 being in close proximity, such as reducing a likelihood of bird ingestion into both aircraft propulsion systems 24 as well as facilitating noise reduction (e.g., provide additional surfaces for acoustic attenuation). Here, the vane leading edge 66 of FIG. 1 is disposed longitudinally forward, upstream of each aircraft propulsion system 24 along the centerline 34.

Each aircraft propulsion system 24 of FIG. 1 is configured as a ducted rotor propulsion system. Examples of the ducted rotor propulsion system include, but are not limited to, a turbofan propulsion system and a turbojet propulsion system. Each aircraft propulsion system 24 of FIG. 1, for example, includes a ducted bladed rotor 82 (e.g., a fan rotor, a first stage compressor rotor, etc.) rotationally driven by an aircraft powerplant 84. This aircraft powerplant 84 may be configured as or otherwise include a turbine engine powered by traditional fuels or alternative fuels (e.g., sustainable aviation fuel, liquid hydrogen, etc.). Alternatively, the aircraft powerplant 84 may be configured as or otherwise include a rotary engine (e.g., a Wankel cycle engine), a hybrid-electric engine, or any other internal combustion (IC) engine or electric motor operable to drive rotation of the bladed rotor 82. The present disclosure, however, is not limited to the foregoing exemplary aircraft propulsion system and/or powerplant types or configurations. It is contemplated, for example, each aircraft propulsion system 24 may alternatively be configured as an open rotor propulsion system. Examples of the open rotor propulsion include, but are not limited to, a pusher fan propulsion system and a propfan propulsion system.

The air system 32 of FIG. 1 includes one or more air circuits 86A and 86B (generally referred to as "86"). For ease of description, the air circuits 86 are described below as fluidly discrete air circuits. The air circuits 86 of FIG. 1, for example, are not fluidly coupled together along their lengths. It is contemplated, however, the air circuits 86 may alternatively be fluidly coupled at one or more locations along their lengths in other embodiments.

Each air circuit 86A, 86B of FIG. 1 includes a circuit inlet 88A, 88B (generally referred to as "88") and a circuit outlet 90A, 90B (generally referred to as "90"). Each air circuit 86 extends within the airframe 22 from its respective circuit inlet 88 to its respective circuit outlet 90. An upstream section of each air circuit 86 of FIG. 1, for example, extends within the aircraft body 26 from its respective circuit inlet 88 to a downstream section of the respective air circuit 86. The downstream section of each air circuit 86 of FIG. 1 extends within the vane 54 from the respective upstream section of the respective air circuit 86 to its respective circuit outlet 90.

Each circuit inlet 88 is arranged with the aircraft body 26. Referring to FIG. 6, each circuit inlet 88 may be configured as a recess such as a dimple, a depression, a channel, a notch or the like in the aircraft body 26. The circuit inlet 88 of FIG. 6, for example, projects partially vertically into the aircraft body 26 from the body exterior surface 60. The circuit inlet 88 of FIG. 6 extends longitudinally within the aircraft body 26 and its body exterior surface 60 between opposing longitudinal ends 92 and 94 of the circuit inlet 88. The circuit inlet 88 of FIG. 6 extends laterally within the aircraft body 26 and its body exterior surface 60 between opposing lateral sides 96 of the circuit inlet 88; see also FIG. 7. The present disclosure, however, is not limited to such an exemplary circuit inlet configuration. Each circuit inlet 88, for example, may alternatively be configured as a scoop which projects vertically out from the aircraft body 26 and its exterior surface 60. In another example, each circuit inlet 88 may be configured as a flush mount scoop such as a NACA type inlet.

Referring to FIG. 1, each circuit inlet 88 is laterally offset (e.g., located remote) from the vertical stabilizer 30 and its vane 54. The first circuit inlet 88A of FIG. 1, for example, is disposed to the vane first side 70A and laterally spaced from the vane 54 and its vane first side 70A by a lateral first distance. This first distance may be selected such that the first circuit inlet 88A is disposed upstream of an airflow inlet 98A into the first propulsion system 24A and its powerplant 84. The first circuit inlet 88A of FIG. 1, for example, laterally overlaps (e.g., is laterally aligned with) the first propulsion system 24A and its airflow inlet 98A; see also FIG. 7. Similarly, the second circuit inlet 88B of FIG. 1 is disposed to the vane second side 70B and laterally spaced from the vane 54 and its vane second side 70B by a lateral second distance. This second distance may be selected such that the second circuit inlet 88B is disposed upstream of an airflow inlet 98B into the second propulsion system 24B and its powerplant 84. The second circuit inlet 88B of FIG. 1, for example, laterally overlaps (e.g., is laterally aligned with) the second propulsion system 24B and its airflow inlet 98B; see also FIG. 7.

Each circuit outlet 90 of FIG. 1 is arranged with the vertical stabilizer 30 and its vane 54. Each circuit outlet 90 of FIG. 1, for example, is arranged in and along a respective one of the vane sides 70. More particularly, the circuit outlets 90 are arranged to the opposing lateral sides 70 of the vane 54. For example, referring to FIGS. 4B and 5B, the first circuit outlet 90A is arranged along the vane second side 70B in the inner portion 76. Referring to FIGS. 4A and 5C, the second circuit outlet 90B is arranged along the vane first side 70A in the outer portion 77. With this arrangement, the first circuit outlet 90A (see FIG. 4B) is located radially inboard of the second circuit outlet 90B (see FIG. 4A). However, referring to FIG. 1, the circuit outlets 90 may be longitudinally aligned along the vane 54 and/or the centerline 34.

During operation of the air system 32, each circuit inlet 88 receives boundary layer air flowing along a respective upstream portion of the body exterior surface 60. This boundary layer air is directed into the respective air circuit 86 through its circuit inlet 88. The air flows through each air circuit 86 to its respective circuit outlet 90 where that air is exhausted from the air system 32 into an environment 100 external to the vertical stabilizer 30 and its vane 54 through the respective circuit outlet 90. Though described herein as being exhausted via circuit outlets 90 configured within a vane 54 of a vertical stabilizer 30, this is not intended to be so limiting, and the air may be configured to flow through the airframe 22 (e.g., the body 26) of the aircraft 20 and be exhausted out a circuit outlet 90 situated in the airframe 22. In such an embodiment, the aircraft 20 may not include a vertical stabilizer 30 or the vertical stabilizer 30 may not include the air flow circuitry associated with removing boundary layer air. By removing the boundary layer air upstream of the aircraft propulsion systems 24, each aircraft propulsion system 24 may receive a substantially free stream of air (e.g., clean air, low turbulence air, etc.) at its airflow inlet 98A, 98B. By placing the circuit outlets 90 along the suction sides (see FIGS. 5B and 5C), movement of air within the external environment 100 along the vane 54 may increase a pumping effect of the air through the air circuits 86. With this arrangement, the air system 32 operates as a passive air system. The air system 32, for example, utilizes the flow of air along the aircraft 20 within the external environment 100 to power its operation. By contrast, an active air system may utilize a pump or a compressor to boost or facilitate air flow.

Exhausting the air from the circuit outlets 90 may also be utilized to facilitate aircraft maneuvering during flight. For example, referring to FIG. 8A, the inner rudder 56A may be moved towards the vane first side 70A/in the first lateral direction to facilitate yawing right/turning right; e.g., pivoted counterclockwise in FIG. 8A. In addition to redirecting the air in the exterior environment 100 flowing along the inner portion 76 of the vane 54, the movement of the inner rudder 56A also increase a camber of the inner portion 76 of the vane 54. Increasing the camber may increase suction at the first circuit outlet 90A thereby pumping additional air through the first air circuit 86A to the suction side of the inner portion 76 of the vane 54. This additional air may push the air flowing within the external environment 100 along the suction side of the inner portion 76 of the vane 54 further away from the vane 54 thereby further increasing an effective camber of the inner portion 76 of the vane 54. This increase in the effective camber may generate additional lift to the second lateral direction such that the aircraft 20 yaws further to the right. During this maneuver, referring to FIG. 8B, the outer rudder 56B may (or may not) remain inline with the mean line 64 of the outer portion 77 of the vane 54. Thus, the inner rudder 56A and the outer rudder 56B may be independently actuated.

Figures 9A, 9B:
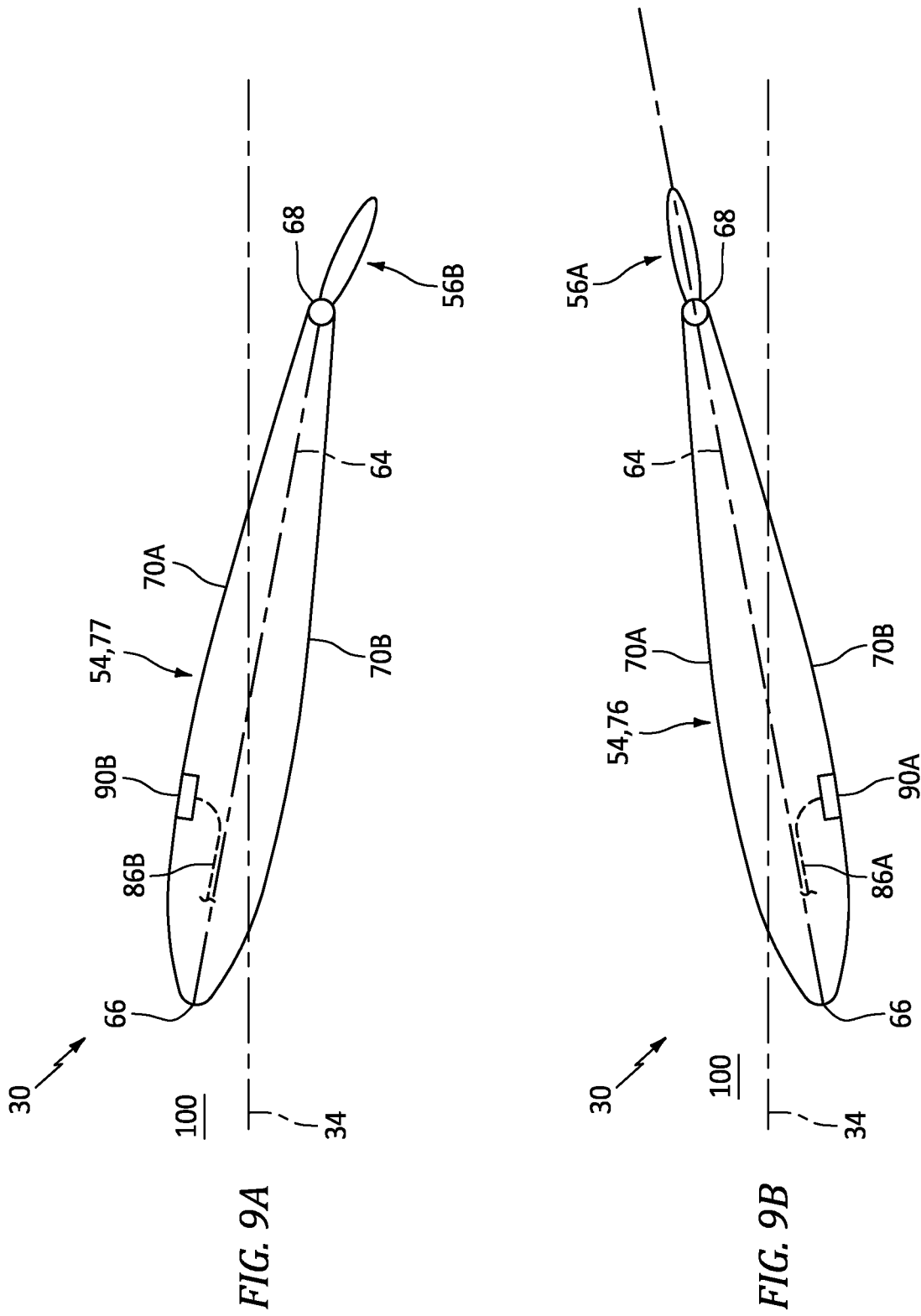
FIGS. 9A and 9B are partial schematic sectional illustrations of the vertical stabilizer at various span locations during a second aircraft maneuver.

In another example, referring to FIG. 9A, the outer rudder 56B may be moved towards the vane second side 70B/in the second lateral direction to facilitate yawing left/turning left; e.g., pivoted clockwise in FIG. 9A. In addition to redirecting the air in the external environment 100 flowing along the outer portion 77 of the vane 54, the movement of the outer rudder 56B also increase a camber of the outer portion 77 of the vane 54. Increasing the camber may increase suction at the second circuit outlet 90B thereby pumping additional air through the second air circuit 86B to the suction side of the outer portion 77 of the vane 54. This additional air may push the air flowing within the external environment 100 along the suction side of the outer portion 77 of the vane 54 further away from the vane 54 thereby further increasing an effective camber of the outer portion 77 of the vane 54. This increase in the effective camber may generate additional lift to the first lateral direction such that the aircraft 20 yaws further to the left. During this maneuver, referring to FIG. 9B, the inner rudder 56A may (or may not) remain inline with the mean line 64 of the inner portion 76 of the vane 54. Thus, the inner rudder 56A and the outer rudder 56B may be independently actuated.

In some embodiments, the vertical stabilizer 30 and its vane 54 may be utilized for lightning strike protection. The vertical stabilizer 30 and its vane 54 may also or alternatively be utilized to increase a radar signature of the aircraft 20 where that aircraft 20 is used for civilian aviation.

Figure 10:
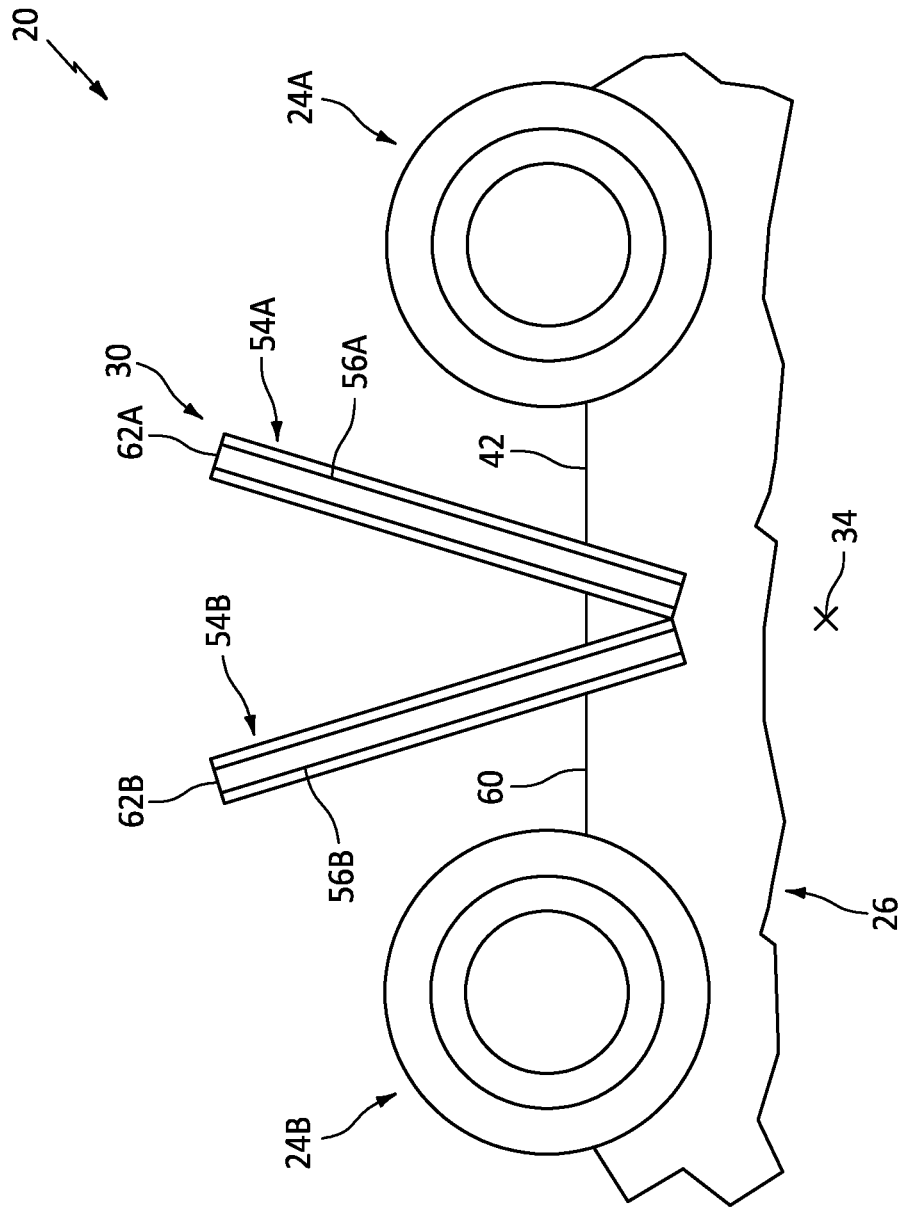
FIG. 10 is a partial end view illustration of the aircraft with another vertical stabilizer arrangement.

The vertical stabilizer 30 is described above with a single vane 54. The present disclosure, however, is not limited to such an exemplary arrangement. For example, referring to FIG. 10, the vertical stabilizer 30 may alternatively include multiple vanes 54A and 54B (generally referred to as "54"). Each vane 54A, 54B of FIG. 10 is connected to the aircraft body 26, and may project spanwise out from the aircraft body 26 to its respective vane tip 62A, 62B (generally referred to as "62"). The first vane 54A may be configured with the second air circuit and its second circuit outlet. The second vane 54B may be configured with the first air circuit and its first circuit outlet. Here, each vane 54A, 54B may be configured with a respective one of the rudders 56A, 56B; schematically shown. The rudder 56A of FIG. 10, for example, is movably attached to the first vane 54A. The rudder 56B of FIG. 10 is moveably attached to the second vane 54B.

Figure 11:
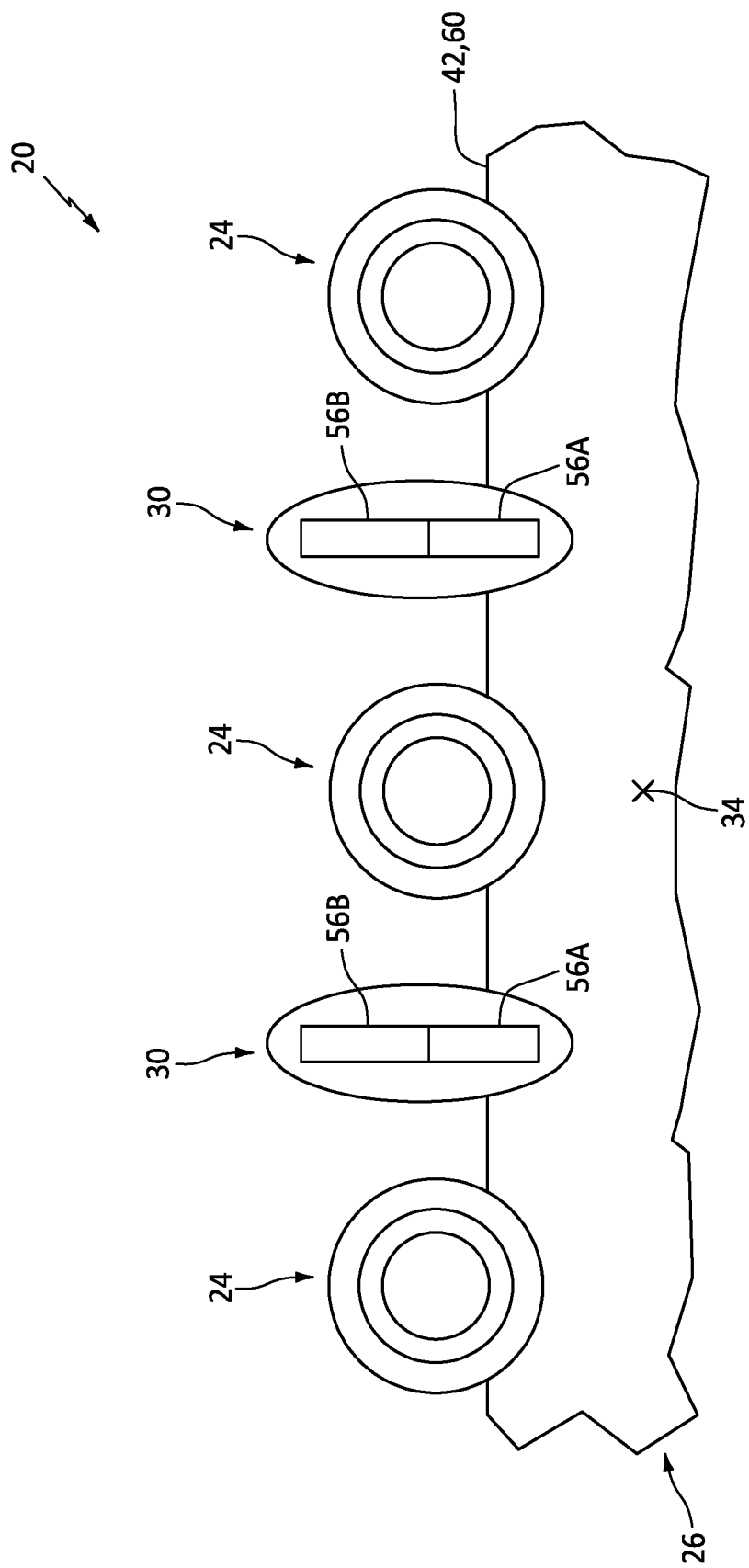
FIG. 11 is a partial end view illustration of the aircraft with multiple vertical stabilizers.

In some embodiments, referring to FIGS. 3 and 10, the aircraft 20 may be configured with a single vertical stabilizer 30. In other embodiments, referring to FIG. 11, the aircraft 20 may be configured with multiple of the vertical stabilizers 30, where each vertical stabilizer 30 is arranged laterally between a respective laterally neighboring pair of the aircraft propulsion systems 24. As discussed above, in still yet other embodiments, the aircraft 20 may include no fixed vertical stabilizer 30 and the air circuits may be routed through the airframe 22 (e.g., the body 26) of the aircraft 20.

The aircraft 20 is described above as the blended wing body aircraft for ease of description. However, it is contemplated the vertical stabilizer 30 and/or the air system 32 may also be utilized with various other types of aircraft.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A system for an aircraft, comprising:
   an airframe including a body and a vane connected to the body, the vane projecting spanwise away from the body to a vane tip, the vane extending longitudinally between a leading edge and a trailing edge, and the vane extending laterally between a first vane side and a second vane side; and
   an air system including a circuit inlet, a circuit outlet and an air circuit, the circuit inlet arranged with the body and laterally offset from the vane, the circuit outlet arranged with the vane, and the air circuit extending within the airframe from the circuit inlet to the circuit outlet, wherein the circuit outlet is disposed along the second vane side.

2. The system of claim 1, wherein the body is configured as a blended wing body.

3. The system of claim 1, further comprising:
   a powerplant comprising a powerplant inlet, the powerplant disposed to the first vane side and connected to the body; and
   the circuit inlet disposed upstream of and laterally overlapping the powerplant inlet.

4. The system of claim 3, wherein the powerplant is configured as a propulsion system for the aircraft.

5. The system of claim 3, further comprising a second powerplant disposed to the second vane side and connected to the body.

6. The system of claim 5, wherein
   the second powerplant comprises a second powerplant inlet; and
   the air system further includes a second circuit inlet disposed upstream of and laterally overlapping the second powerplant inlet.

7. The system of claim 1, wherein
the vane projects spanwise out from an exterior surface of the body to the vane tip; and
the circuit inlet comprises a recess projecting into the body from the exterior surface of the body.

8. The system of claim 1, wherein the circuit inlet is disposed to the first vane side.

9. The system of claim 1, wherein
at least a first portion of the vane is angularly offset from a centerline of the airframe by a first portion stagger angle such that the second vane side along the first portion of the vane forms a suction side of the first portion of the vane; and
the circuit outlet is disposed along the suction side of the first portion of the vane.

10. The system of claim 9, wherein
a second portion of the vane is angularly offset from the centerline of the airframe by a second portion stagger angle such that the first vane side along the second portion of the vane forms a suction side of the second portion of the vane; and
the air system further includes a second circuit outlet disposed along the suction side of the second portion of the vane.

11. The system of claim 10, further comprising:
a first rudder arranged along the first portion of the vane at the trailing edge; and
a second rudder arranged along the second portion of the vane at the trailing edge;
the first rudder configured to move independent of the second rudder.

12. The system of claim 10, wherein the first portion of the vane is located spanwise between the body and the second portion of the vane.

13. The system of claim 1, wherein
the circuit inlet is a first circuit inlet, the circuit outlet is a first circuit outlet, the air circuit is a first air circuit, and the air system further includes a second circuit inlet, a second circuit outlet and a second air circuit extending within the airframe from the second circuit inlet to the second circuit outlet;
the vane is a first vane, and the airframe further includes a second vane connected to the body;
the second vane projects spanwise away from the body to a vane tip of the second vane, the second vane extends longitudinally between a leading edge of the second vane and a trailing edge of the second vane, the second vane extends laterally between a first vane side of the second vane and a second vane side of the second vane, and the second vane side of the second vane laterally faces the first vane side of the first vane; and
the second circuit inlet is arranged with the body and is laterally offset from the second vane, and the second circuit outlet is arranged with the second vane.

14. The system of claim 13, wherein
the first circuit outlet is arranged along the second vane side of the first vane; and
the second circuit outlet is arranged along the first vane side of the second vane.

15. A system for an aircraft, comprising:
a vertical stabilizer comprising a vane, the vane projecting spanwise out to a vane tip, the vane extending longitudinally between a leading edge and a trailing edge, and the vane extending laterally between a first vane side and a second vane side; and an air system including a first air circuit and a second air circuit;
the first air circuit extending from a first circuit inlet to a first circuit outlet, the first circuit inlet located remote from the vane, and the first circuit outlet arranged along the second vane side; and
the second air circuit extending from a second circuit inlet to a second circuit outlet, the second circuit inlet located remote from the vane, and the second circuit outlet arranged along the first vane side.

16. The system of claim 15, wherein
the first circuit inlet is disposed to and laterally spaced from the first vane side; and
the second circuit inlet is disposed to and laterally spaced from the second vane side.

17. The system of claim 15, wherein the second air circuit is fluidly decoupled from the first air circuit.

18. The system of claim 15, wherein
the vertical stabilizer further comprises a first rudder and a second rudder;
the first rudder is located at the trailing edge and the spanwise overlaps the first circuit outlet; and
the second rudder is located at the trailing edge and the spanwise overlaps the second circuit outlet.

19. The system of claim 15, further comprising:
a first propulsion system comprising a first airflow inlet, the first circuit inlet laterally aligned with and upstream of the first airflow inlet; and
a second propulsion system comprising a second airflow inlet, the second circuit inlet laterally aligned with and upstream of the second airflow inlet;
the vane located laterally between and longitudinally overlapping the first propulsion system and the second propulsion system.

20. A system for an aircraft, comprising:
an airframe body comprising a centerline;
a vane connected to the airframe body, the vane projecting spanwise out to a vane tip, the vane extending longitudinally between a leading edge and a trailing edge, and the vane extending laterally between a first vane side and a second vane side;
a first portion of the vane having a first mean line extending from the leading edge to the trailing edge, the first mean line angularly offset from the centerline by a first stagger angle;
a second portion of the vane having a second mean line extending from the leading edge to the trailing edge, the second mean line angularly offset from the centerline by a second stagger angle opposite the first stagger angle;
a first rudder attached to the vane and spanwise overlapping the first portion of the vane; and
a second rudder attached to the vane and spanwise overlapping the second portion of the vane,
wherein the airframe body is configured as a blended wing body.

21. The system of claim 20, further comprising:
an air system including a first air circuit and a second air circuit;
the first air circuit extending from a first circuit inlet to a first circuit outlet, the first circuit inlet disposed along the airframe body remote from the vane, and the first circuit outlet arranged along the first portion of the vane at the second vane side; and
the second air circuit extending from a second circuit inlet to a second circuit outlet, the second circuit inlet disposed along the airframe body remote from the vane, and the second circuit outlet arranged along the second portion of the vane at the first vane side.

* * * * *